(12) United States Patent
Nishida et al.

(10) Patent No.: US 11,851,364 B2
(45) Date of Patent: Dec. 26, 2023

(54) SYNTHETIC QUARTZ GLASS SUBSTRATE AND MAKING METHOD

(71) Applicant: SHIN-ETSU CHEMICAL CO., LTD., Tokyo (JP)

(72) Inventors: Junichiro Nishida, Joetsu (JP); Kazuo Shirota, Joetsu (JP); Hisashi Yagi, Joetsu (JP); Masaki Takeuchi, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 1330 days.

(21) Appl. No.: 16/254,191

(22) Filed: Jan. 22, 2019

(65) Prior Publication Data

US 2019/0225539 A1    Jul. 25, 2019

(30) Foreign Application Priority Data

Jan. 23, 2018  (JP) ................................ 2018-008527

(51) Int. Cl.
| | |
|---|---|
| *C03C 21/00* | (2006.01) |
| *C03B 23/04* | (2006.01) |
| *C03B 25/02* | (2006.01) |
| *C03C 23/00* | (2006.01) |
| *C03B 19/14* | (2006.01) |
| *C03B 32/00* | (2006.01) |

(Continued)

(52) U.S. Cl.
CPC ........ *C03C 21/007* (2013.01); *C03B 19/1469* (2013.01); *C03B 23/04* (2013.01); *C03B 25/025* (2013.01); *C03B 32/00* (2013.01); *C03C 3/06* (2013.01); *C03C 4/0071* (2013.01); *C03C 23/002* (2013.01); *C03C 23/007* (2013.01); *C03B 2201/21* (2013.01); *C03B 2201/23* (2013.01); *C03C 2201/21* (2013.01); *C03C 2203/52* (2013.01)

(58) Field of Classification Search
CPC .................................................. C03C 2201/21
See application file for complete search history.

(56) References Cited

U.S. PATENT DOCUMENTS

| | | | |
|---|---|---|---|
| 6,576,578 B1 * | 6/2003 | Ikuta | .................. C03B 19/1453 65/17.6 |
| 2002/0170320 A1 | 11/2002 | Schotz et al. | |

(Continued)

FOREIGN PATENT DOCUMENTS

| | | |
|---|---|---|
| JP | 2004-123420 A | 4/2004 |
| JP | 2006-225249 A | 8/2006 |
| WO | WO 00/76923 A1 | 12/2000 |

OTHER PUBLICATIONS

European Search Report for Appl. No. 19153346.2 dated May 31, 2019.

*Primary Examiner* — David Sample
(74) *Attorney, Agent, or Firm* — Birch, Stewart, Kolasch & Birch, LLP

(57) ABSTRACT

A synthetic quartz glass substrate having a controlled hydrogen molecule concentration is prepared by (a) hot shaping a synthetic quartz glass ingot into a glass block, (b) slicing the glass block into a glass plate, (c) annealing the glass plate at 500-1,250° C. for 15-60 hours, (d) hydrogen doping treatment of the glass plate in a hydrogen gas atmosphere at 300-450° C. for 20-40 hours, and (e) dehydrogenation treatment of the glass plate at 200-400° C. for 5-10 hours.

8 Claims, 2 Drawing Sheets

(51) Int. Cl.
*C03C 3/06* (2006.01)
*C03C 4/00* (2006.01)

(56) References Cited

U.S. PATENT DOCUMENTS

| | | | |
|---|---|---|---|
| 2003/0027705 A1* | 2/2003 | Nishimura | C03B 19/1453 |
| | | | 501/54 |
| 2003/0051507 A1 | 3/2003 | Ikuta et al. | |
| 2003/0172679 A1* | 9/2003 | Martin | C03B 19/1453 |
| | | | 65/117 |
| 2006/0081008 A1 | 4/2006 | Hirata et al. | |
| 2007/0066477 A1* | 3/2007 | Harper | C03C 3/06 |
| | | | 65/17.4 |
| 2009/0252947 A1* | 10/2009 | Rosch | C03B 19/12 |
| | | | 428/305.5 |
| 2016/0145137 A1* | 5/2016 | Eva | G02B 13/143 |
| | | | 65/17.4 |

* cited by examiner

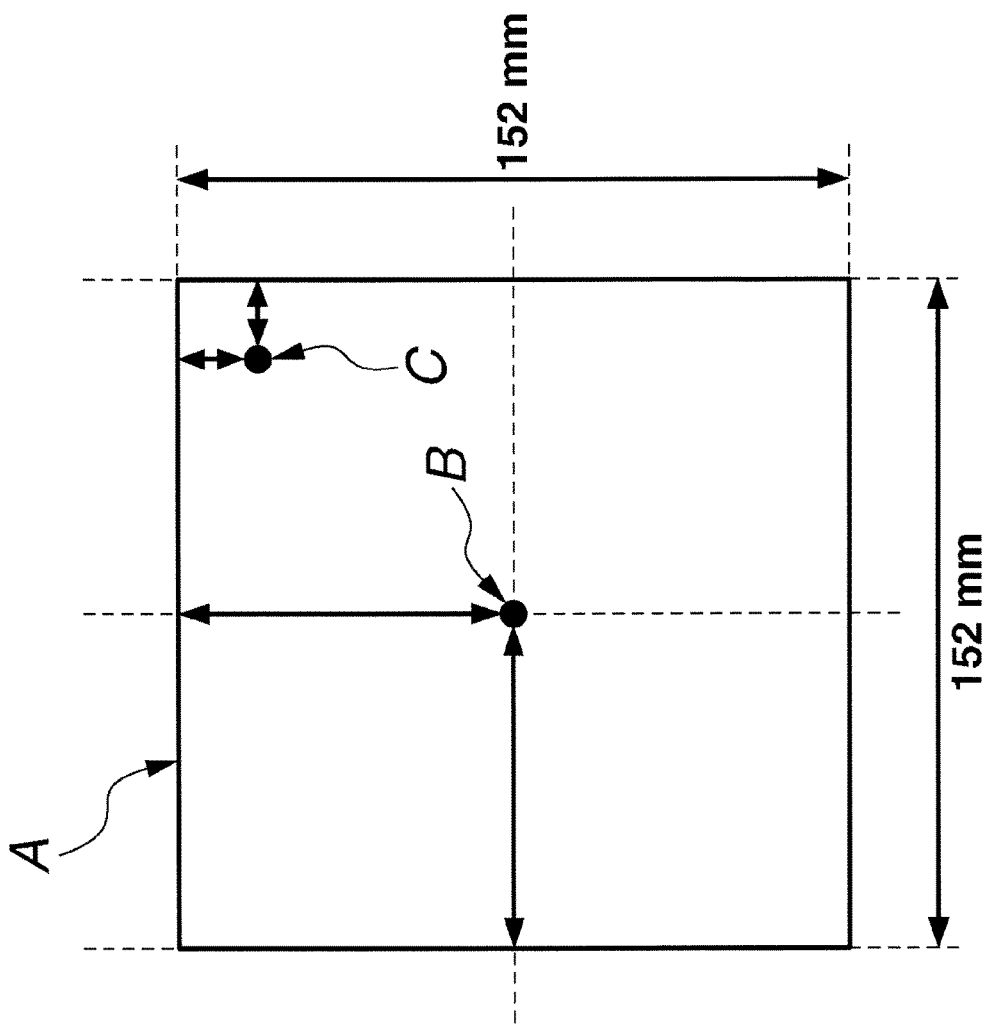

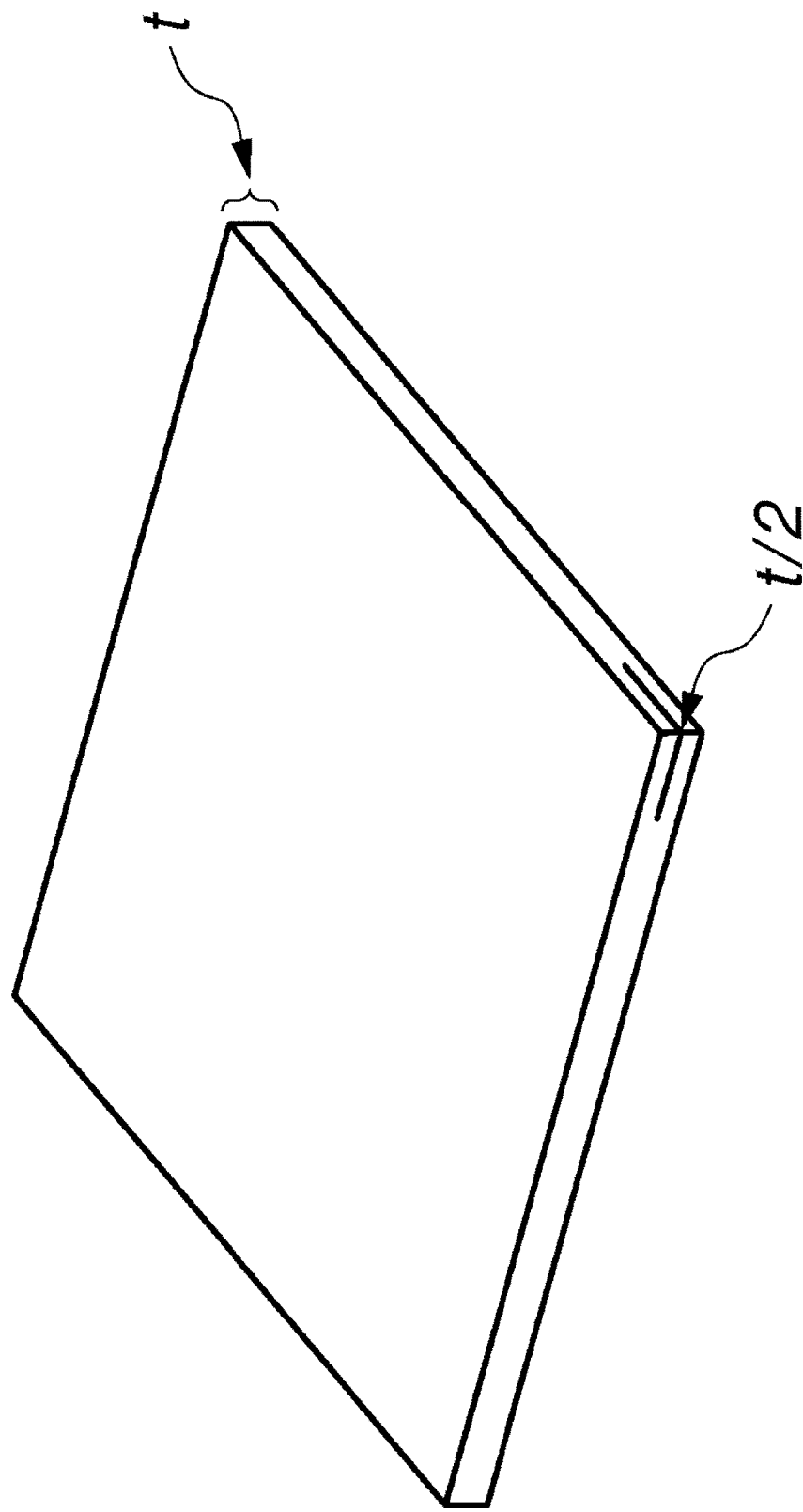

SYNTHETIC QUARTZ GLASS SUBSTRATE AND MAKING METHOD

CROSS-REFERENCE TO RELATED APPLICATION

This non-provisional application claims priority under 35 U.S.C. § 119(a) on Patent Application No. 2018-008527 filed in Japan on Jan. 23, 2018, the entire contents of which are hereby incorporated by reference.

TECHNICAL FIELD

This invention relates to a synthetic quartz glass substrate and a method for preparing the same. More particularly, it relates to a synthetic quartz glass substrate suited for use with excimer laser, especially ArF excimer laser and in the ArF immersion lithography, and a method for preparing the same.

BACKGROUND ART

Modern semiconductor integrated circuits trend toward an outstandingly high integration density. Under such trend, the lithography process for the fabrication of semiconductor devices uses an exposure energy source of shorter wavelength. The current mainstream of photolithography covers from KrF excimer laser (248.3 nm) to ArF excimer laser (193.4 nm). It is believed that the immersion lithography is introduced for achieving a finer feature size and utilizing lenses of higher NA and the power of ArF excimer laser as the energy source is increased for improving the throughput of manufacture.

In accordance with the progress of energy sources toward shorter wavelength and lenses toward higher NA, optical parts of synthetic quartz glass in exposure tools such as lenses, windows, prisms and photomasks are required to have higher accuracy. In particular, synthetic quartz glass for photomasks intended for main use with ArF excimer laser must meet many requirements including high and uniform UV transmission, the sustainability and uniformity of transmittance during long-term irradiation of excimer laser, and a reduction of in-plane birefringence when polarized illumination is employed.

When synthetic quartz glass is irradiated with light of excimer laser, typically ArF excimer laser over a long period of time, there are created an absorption band centering at wavelength 214 nm, known as E' center ($\equiv$Si·), and another absorption band centering at wavelength 260 nm, known as NBOHC (non-crosslinked oxygen radical: $\equiv$Si—O·) inviting a drop of transmittance. In synthetic quartz glass, hydrogen molecules act to restore such defects as E' center and NBOHC. In order to exert a significant restoring action, hydrogen molecules must be contained beyond a certain concentration (specifically at least $3\times10^{16}$ molecules/cm$^3$). The inclusion of hydrogen molecules beyond a certain level is also preferred from the standpoint of preventing emanation of red fluorescence after irradiation of UV light inclusive of excimer laser light for a certain period. For photomask-forming synthetic quartz glass substrates, the uniformity of light transmittance within an effective range to receive excimer laser light is important. It is also preferred that excimer laser resistance be uniform in substrate plane. It is thus necessary to adjust the hydrogen molecule concentration to be uniform within the substrate.

The hydrogen molecule concentration in synthetic quartz glass may be adjusted by dehydrogenation treatment of heating the glass in an atmosphere other than hydrogen gas for eliminating hydrogen molecules from the glass or by hydrogen doping treatment of placing the glass in a heating furnace with hydrogen gas atmosphere for introducing hydrogen molecules into the glass. For example, Patent Document 1 discloses hydrogen doping treatment of a synthetic quartz glass block to introduce hydrogen molecules into the glass in a concentration of about $5\times10^{17}$ molecules/cm$^3$.

Where synthetic quartz glass is a substrate material for masks for use in the photolithography process, the hydrogen molecule concentration may be adjusted at the stage of a substrate which is obtained by slicing a synthetic quartz glass block. For example, Patent Document 2 discloses a method for preparing a synthetic quartz glass substrate having an adjusted hydrogen molecule concentration by annealing a synthetic quartz glass block, slicing the block into a substrate, annealing the substrate for strain removal, and finally effecting hydrogen doping treatment on the substrate. Also, Patent Document 3 discloses a method for adjusting a hydrogen molecule concentration by effecting hydrogen doping on a synthetic quartz glass disk as sliced and heating the disk in a helium atmosphere for a predetermined time for dehydrogenation treatment.

CITATION LIST

Patent Document 1: JP-A 2004-123420
Patent Document 2: JP-A 2006-225249 (US 20060081008)
Patent Document 3: WO 00/076923

SUMMARY OF INVENTION

The method of Patent Document 1, however, has the problem of low productivity. Since heat treatment is carried out at the stage of a synthetic quartz glass block, annealing treatment takes about 1,000 hours and hydrogen doping treatment takes about 1,500 to 1,800 hours.

In this regard, the method of Patent Document 2 carries out heat treatment on a substrate as sliced and thus takes a short treatment time as compared with the heat treatment of a block. However, another problem arises when a sliced substrate is subjected to hydrogen doping treatment. Since the hydrogen molecule concentration starts to increase from the substrate surface, the hydrogen molecule concentration at the substrate surface is noticeably higher than that in the substrate interior. If the hydrogen molecule concentration at the substrate surface is too high, there is a strong possibility that under irradiation conditions including a high output density of excimer laser (e.g., ArF or F$_2$), formation of microcracks at or near the surface on the excimer laser emergent side is unavoidable. Once microcracks form, excimer laser light is scattered thereby. This brings an extreme drop of transmittance, raising noticeable problems to exposure performance. Also the method of Patent Document 2 has the problem of low productivity because the anneal treatment of a glass block takes a long time.

To suppress formation of microcracks, the hydrogen molecule concentration at the substrate surface must be equal to or less than $5\times10^{17}$ molecules/cm$^3$. In the method of Patent Document 3, the hydrogen molecule concentration in a glass surface region is reduced by dehydrogenation treatment, but the hydrogen molecule concentration in the glass interior is also reduced below $3\times10^{16}$ molecules/cm$^3$. This suggests a strong possibility that satisfactory excimer laser resistance and red fluorescence suppressing effect are not available. Also, Patent Document 3 involves hydrogen doping treatment and dehydrogenation treatment, which are carried out at a temperature in the range of 500 to 600° C. which overlaps the glass structure change temperature range. There is a possibility that structural defects which cause to exacerbate birefringence are induced, depending on a selected program.

Accordingly, there is a demand for a method for preparing a synthetic quartz glass substrate through brief treatments, the glass substrate being capable of meeting all requirements including (1) light resistance or suppression of the reduction of transmittance by excimer laser irradiation, (2) uniform light resistance in the effective range of excimer laser irradiation, (3) suppression of the emanation of red fluorescence by UV irradiation, and (4) suppression of microcracking by excimer laser irradiation.

An object of the invention is to provide a synthetic quartz glass substrate having a fully controlled hydrogen molecule concentration and a method for preparing the same.

The inventors have found that a synthetic quartz glass substrate having a fully controlled hydrogen molecule concentration is briefly prepared by subjecting a synthetic quartz glass plate to annealing treatment, to hydrogen doping treatment for adjusting a hydrogen molecule concentration within the plate, and then to dehydrogenation treatment for reducing the hydrogen molecule concentration on the substrate surface.

In one aspect, the invention provides a method for preparing a synthetic quartz glass substrate, comprising the steps of:
(a) hot shaping a synthetic quartz glass ingot into a synthetic quartz glass block,
(b) slicing the synthetic quartz glass block into a synthetic quartz glass plate,
(c) subjecting the glass plate to annealing treatment at a temperature of 500 to 1,250° C. for 15 to 60 hours,
(d) subjecting the glass plate as annealed to hydrogen doping treatment in a hydrogen gas atmosphere at 300 to 450° C. for 20 to 40 hours, and
(e) subjecting the glass plate as doped to dehydrogenation treatment at 200 to 400° C. for 5 to 10 hours.

The method may further comprise the step (f) of irradiating UV radiation to the glass plate as dehydrogenated in step (e).

In one preferred embodiment, the synthetic quartz glass plate as annealed in step (c) has a hydrogen molecule concentration with a highest value of up to $2\times10^{16}$ molecules/cm$^3$.

In one preferred embodiment, the synthetic quartz glass ingot used in step (a) has an OH group concentration of 300 to 1,200 ppm.

In another aspect, the invention provides a synthetic quartz glass substrate having a pair of major surfaces and a thickness t therebetween. The substrate has a hydrogen molecule concentration at an arbitrary point on the substrate, which concentration has a lowest value of at least $3\times10^{16}$ molecules/cm$^3$ and a highest value of up to $1\times10^{18}$ molecules/cm$^3$ in the range from the major surface to the thickness middle t/2, and a maximum at any point in the range from the major surface to t/4.

In one preferred embodiment, the hydrogen molecule concentration at the major surface is $5\times10^{16}$ to $5\times10^{17}$ molecules/cm$^3$.

In one preferred embodiment, the hydrogen molecule concentration at the thickness middle t/2 is $3\times10^{16}$ to $3\times10^{17}$ molecules/cm$^3$.

In one preferred embodiment, the difference between the highest and lowest values of the hydrogen molecule concentration in a plane at a certain thickness is up to $5\times10^{16}$ molecules/cm$^3$.

Advantageous Effects of Invention

The method of the invention involves brief heat treatments to prepare a synthetic quartz glass substrate having a reduced birefringence. The glass substrate is prepared in a short time. The glass substrate has a hydrogen molecule concentration which is maintained high and uniform in the interior, but reduced only at the substrate surface.

The synthetic quartz glass substrate obtained from the inventive method has advantages including light resistance or suppression of the reduction of transmittance by excimer laser irradiation, uniform light resistance in the effective range of excimer laser irradiation, suppression of the emanation of red fluorescence by UV irradiation, and suppression of the formation of microcracks by excimer laser irradiation. The synthetic quartz glass substrate is best suited for use with excimer laser, typically ArF excimer laser, specifically in the ArF immersion lithography.

BRIEF DESCRIPTION OF DRAWINGS

FIG. 1 is a schematic plan view showing a hydrogen molecule concentration measuring position on a synthetic quartz glass substrate.

FIG. 2 is a schematic view showing the thickness of the synthetic quartz glass substrate.

DESCRIPTION OF PREFERRED EMBODIMENTS

The invention provides a method for preparing a synthetic quartz glass substrate, comprising the steps of:
(a) hot shaping a synthetic quartz glass ingot into a synthetic quartz glass block,
(b) slicing the synthetic quartz glass block into a synthetic quartz glass plate,
(c) annealing treatment of the glass plate at a temperature of 500 to 1,250° C. for 15 to 60 hours,
(d) hydrogen doping treatment of the glass plate as annealed in a hydrogen gas atmosphere at 300 to 450° C. for 20 to 40 hours, and
(e) dehydrogenation treatment of the glass plate as doped at 200 to 400° C. for 5 to 10 hours.

Step (a)

The synthetic quartz glass with which the inventive method starts may be an ingot obtained by introducing a silica source compound such as a silane or siloxane compound into an oxyhydrogen flame, effecting vapor-phase hydrolysis or oxidative decomposition to form silica fine particles, and depositing the particles on a target while vitrifying them. The ingot forming process may be either the direct process of depositing silica fine particles on the target and concurrently melting/vitrifying or the indirect process of depositing silica fine particles on the target and then heating for vitrification.

The synthetic quartz glass ingot has an OH group concentration of preferably 300 to 1,200 ppm, more preferably 400 to 900 ppm, even more preferably 450 to 800 ppm, from the standpoint of reducing birefringence or preventing a reduction of UV transmittance. The OH group concentration of a glass ingot is computed by measuring the absorption of OH groups by means of an IR spectrophotometer (e.g., SolidSpec-3700 by Shimadzu Corp.).

The OH group concentration of a synthetic quartz glass ingot may be adjusted, in the case of the direct process, by controlling the amount of silica source compound, the amounts of oxygen and hydrogen used, and the configuration of a burner during ingot preparation. In the case of the indirect process, the OH group concentration may be adjusted by controlling the amount of silica source compound, the amounts of oxygen and hydrogen used, and the configuration of a burner during deposition of silica fine particles or by heat treatment in a water vapor atmosphere at a lower temperature than the silica particle vitrifying temperature.

The resulting synthetic quartz glass ingot is preferably cleaned. For example, any impurities deposited on the surface and bubbles just below the surface are removed by cylindrical grinding, and any surface stains are removed by immersion in hydrofluoric acid solution. The order of previous surface cleaning and subsequent heat treatment of a synthetic quartz glass ingot ensures that the transmittance of glass to ArF excimer laser is maintained high when used as a photomask-forming optical member in ArF excimer laser lithography.

Thereafter, the glass ingot is placed in a mold of high purity carbon in a vacuum melting furnace. While the ingot is held at a temperature of 1,700 to 1,900° C. for 30 to 120 minutes, the cylindrical quartz glass ingot is hot shaped into a quartz glass block of any desired shape.

Step (b)

The synthetic quartz glass block obtained in step (a) is sliced and optionally chamfered into synthetic quartz glass plates of predetermined size, for example, 152 mm×152 mm×7 mm thick, with rough surfaces. The thickness of the glass plate is preferably in a range of 6.5 to 10 mm, more preferably 6.9 to 7.5 mm, as considered from the standpoints of productivity and efficiency during each heat treatment, and substrate in-plane uniformity of hydrogen doping during subsequent hydrogen doping treatment.

Step (c)

The synthetic quartz glass plate obtained in step (b) is annealed. The annealing treatment may be carried out, for example, by placing the glass plate in an electric furnace, and heating the plate under atmospheric pressure. It is not critical how to place the glass plate in the furnace.

The annealing treatment is typically at a temperature of 500 to 1,250° C., preferably 500 to 1,200° C., more preferably 500 to 1,100° C. Temperatures below 500° C. may lead to an insufficient reduction of birefringence. At temperatures above 1,250° C., there is a likelihood that metal impurities such as Na, Cu and Fe diffuse in from the ambient environment, inviting a drop of UV transmittance of quartz glass.

The annealing treatment is typically continued for a time of 15 to 60 hours, preferably 30 to 50 hours. If the time is shorter than 15 hours, birefringence may not be fully reduced. Anneal for longer than 60 hours allows metal impurities such as Na, Cu and Fe to diffuse, inviting a drop of UV transmittance of quartz glass.

The program of annealing treatment is not particularly limited. For example, annealing treatment may be carried out according to the following program whereby the birefringence of the synthetic quartz glass plate may be efficiently reduced.

Specifically, annealing treatment is carried out by heating to the highest temperature at a rate of preferably at least 50° C./hr, more preferably at least 100° C./hr. The highest temperature is preferably in a range of 1,060 to 1,250° C., more preferably 1,080 to 1,200° C. The holding time at the highest temperature is preferably up to 0.5 hour, more preferably 0.05 to 0.25 hour, as considered from the standpoint of suppressing deformation of the glass plate. Thereafter, the glass plate is cooled to a temperature of 950 to 1,080° C. at a rate of −7.5 to −30° C./hr, and preferably held at the temperature of 950 to 1,080° C. for 7 to 15 hours, in consideration of the influence of thermal hysteresis upon cooling and the uniformity of temperature distribution within the glass plate.

Subsequently, the glass plate is slowly cooled to 500° C. at a rate of −25 to −85° C./hr. This slow cooling step is preferably conducted in two stages from the standpoints of reducing the annealing time and efficiently reducing birefringence. Specifically, the slow cooling step includes a first slow cooling step from the temperature of 950 to 1,080° C. to 850° C. at a rate of −25 to −45° C./hr, more preferably −30 to −40° C./hr and a second slow cooling step from 850° C. to 500° C. at a rate of −25 to −85° C./hr, more preferably −35 to −75° C./hr, even more preferably −45 to −75° C./hr.

The synthetic quartz glass plate after the annealing treatment preferably has a highest hydrogen molecule concentration of up to $2 \times 10^{16}$ molecules/cm$^3$, more preferably up to $1 \times 10^{16}$ molecules/cm$^3$, for the following reason. Since the annealing treatment is at a relatively high temperature, hydrogen molecules are eliminated from within the glass plate. As a result, the glass plate after the annealing treatment has a varying hydrogen molecule concentration distribution, which affects the hydrogen molecule concentration distribution of the glass plate after the subsequent step, hydrogen doping treatment. As long as the hydrogen molecule concentration of the synthetic quartz glass plate after the annealing treatment is up to $2 \times 10^{16}$ molecules/cm$^3$, its lower limit is not critical and is preferably equal to the lower limit of detection (e.g., $1.0 \times 10^{16}$ molecules/cm$^3$).

It is noted that the hydrogen molecule concentration is measured by Raman spectrophotometry using a Raman microspectrophotometer. Since the sensitivity of a detector of the Raman microspectrophotometer includes a daily variance, calibration is performed using standards prior to measurement.

The hydrogen molecule concentration is measurable in a unit of diameter 0.1 mm. As used herein, the term "hydrogen molecule concentration" refers to the hydrogen molecule concentration at the measurement point when a hydrogen molecule concentration is measured at a point within the synthetic quartz glass plate in a unit of diameter 0.1 mm. The highest value of hydrogen molecule concentration refers to the highest value among hydrogen molecule concentrations measured within the synthetic quartz glass plate in a unit of diameter 0.1 mm.

Step (d)

The synthetic quartz glass plate after the annealing treatment of step (c) is subjected to hydrogen doping treatment. The hydrogen doping treatment may be performed, for example, by placing the synthetic quartz glass substrate plate in a hydrogen-purgeable electric heating furnace. Since a synthetic quartz glass plate is uniformly doped with hydrogen molecules independent of the charge mode and position, the placement of a plate and the number of plates for hydrogen doping treatment are not particularly limited.

The atmosphere within the furnace should preferably have a hydrogen molecule concentration of at least 98% by volume, more preferably at least 99% by volume, for efficiency and safety of hydrogen doping treatment. The pressure within the furnace when the treatment temperature is reached is preferably 0.1 to 0.2 MPa, more preferably 0.1 to 0.15 MPa in absolute pressure.

The treatment temperature is typically 300 to 450° C., preferably 350 to 400° C. At temperatures below 300° C., the hydrogen doping treatment may take a longer time with a loss of productivity. Temperatures above 450° C., which correspond to the glass structure changing temperature region, may induce structural defects which cause to degrade birefringence.

The time of hydrogen doping treatment on the synthetic quartz glass plate is typically 20 to 40 hours, preferably 24 to 40 hours at the above doping temperature. A time of less than 20 hours may be too short to increase the hydrogen molecule concentration to the desired value whereas a time in excess of 40 hours may allow metal impurities to diffuse, inducing a drop of transmittance and degradation of birefringence.

As viewed from the standpoints of satisfactory resistance to excimer laser or other UV irradiation and prevention of red fluorescence emanation, the hydrogen molecule concentration of the synthetic quartz glass plate after the hydrogen doping treatment is preferably $3 \times 10^{16}$ to $1 \times 10^{18}$ molecules/cm³, more preferably $5 \times 10^{16}$ to $8 \times 10^{17}$ molecules/cm³, even more preferably $1 \times 10^{17}$ to $5 \times 10^{17}$ molecules/cm³, though not particularly limited.

As viewed from the standpoint of reducing the difference in resistance to excimer laser or other UV irradiation within the effective range of UV irradiation, the difference between highest and lowest values of hydrogen molecule concentration in a plane at the same thickness in the synthetic quartz glass plate is preferably within $5 \times 10^{17}$ molecules/cm³, more preferably within $2 \times 10^{17}$ molecules/cm³, even more preferably within $5 \times 10^{16}$ molecules/cm³, further preferably within $3 \times 10^{16}$ molecules/cm³, though not particularly limited.

Step (e)

The synthetic quartz glass plate after the hydrogen doping treatment of step (d) is subjected to dehydrogenation treatment. The glass plate as hydrogen doped at its surface has a hydrogen molecule concentration which is often higher than that in the interior of the glass plate, with the risk that microcracks form near the plate surface during excimer laser or other UV irradiation. Then in order to maintain resistance to excimer laser or other UV irradiation and to suppress microcracks, dehydrogenation treatment is performed until the hydrogen molecule concentration at the plate surface is reduced to $5 \times 10^{16}$ to $5 \times 10^{17}$ molecules/cm³ while maintaining the hydrogen molecule concentration in the interior of the glass plate.

The dehydrogenation treatment is performed, for example, by placing the synthetic quartz glass plate in an electric heating furnace. The placement of a plate and the number of plates are not particularly limited. Also, the type and concentration of a gas of the furnace atmosphere are not particularly limited unless physical properties of the glass plate are affected.

The temperature of dehydrogenation treatment is typically in a range of 200 to 400° C., preferably 250 to 350° C. Temperatures below 200° C. may be too low to eliminate hydrogen molecules from the glass plate. Temperatures above 400° C., which correspond to the glass structure changing temperature region, may induce structural defects which cause to degrade birefringence.

The pressure within the furnace when the treatment temperature is reached is preferably 0.1 to 0.2 MPa, more preferably 0.1 to 0.13 MPa in absolute pressure though not particularly limited.

The time of dehydrogenation treatment on the synthetic quartz glass plate is typically 5 to 10 hours, preferably 6 to 8 hours. A time of less than 5 hours may be too short for dehydrogenation from the plate surface. If the time exceeds 10 hours, the hydrogen molecule concentration in the interior of the glass plate may also be reduced.

Step (f)

To improve the initial transmittance at wavelength 193.4 nm of ArF excimer laser, the synthetic quartz glass plate may be irradiated with UV radiation. For UV irradiation, for example, a low-pressure mercury lamp, mercury xenon lamp or excimer lamp may be used. The irradiation time is preferably 5 to 72 hours, more preferably 12 to 48 hours.

This is followed by conventional grinding steps such as lapping and polishing steps to produce a synthetic quartz glass substrate of the desired size, typically a synthetic quartz glass substrate having a pair of major surfaces of 152 mm×152 mm and a thickness t of 6.35 mm, as shown in FIG. 2.

The synthetic quartz glass substrate has a hydrogen molecule concentration at an arbitrary point on the substrate, which has a lowest value of at least $3 \times 10^{16}$ molecules/cm³, preferably at least $5 \times 10^{16}$ molecules/cm³, and a highest value of up to $1 \times 10^{18}$ molecules/cm³, preferably up to $7 \times 10^{17}$ molecules/cm³, more preferably up to $3 \times 10^{17}$ molecules/cm³, in the range from the major surface to the thickness middle t/2. If the hydrogen molecule concentration is less than $3 \times 10^{16}$ molecules/cm³, no satisfactory resistance to excimer laser or other UV irradiation is available and the red fluorescence suppressing effect is lost. If the hydrogen molecule concentration exceeds $1 \times 10^{18}$ molecules/cm³, no satisfactory excimer laser resistance is available because the defects formed upon UV irradiation are restored by hydrogen molecules, and OH groups created thereby inhibit transmission of light with wavelength 180 nm or shorter.

Also the synthetic quartz glass substrate has a hydrogen molecule concentration at an arbitrary point which has a maximum in the range from the major surface to a thickness of t/4, preferably in the range from the major surface to a thickness of t/8 (see FIG. 2).

When excimer laser radiation is irradiated to the major surface of the synthetic quartz glass substrate, hydrogen molecules on the major surface are consumed. This means that a point having a higher hydrogen molecule concentration than on the major surface exists in the interior below the major surface, and then hydrogen molecules are supplied from the interior to the major surface to maintain excimer laser resistance. This effectively maintains satisfactory excimer laser resistance while suppressing microcracks. However, if the hydrogen molecule concentration has a maximum at an arbitrary point in the interior below the range from the major surface to a thickness of t/4, no effective supply of hydrogen molecules to the major surface is expectable, and excimer laser resistance is not maintained significant.

The presence or absence of a maximum and the position thereof are determined as follows. When a hydrogen molecule concentration is measured at an arbitrary point on the glass substrate in a depth direction from the major surface to the thickness middle t/2 at a pitch of diameter 0.1 mm, the highest value is regarded the maximum, and the position of the maximum is identified by the thickness level in the substrate where the maximum exists.

In the synthetic quartz glass substrate, the hydrogen molecule concentration at the major surface is preferably $5 \times 10^{16}$ to $5 \times 10^{17}$ molecules/cm³, more preferably $8 \times 10^{16}$ to $3 \times 10^{17}$ molecules/cm³, even more preferably $8 \times 10^{16}$ to $2 \times 10^{17}$ molecules/cm$^3$, from the standpoints of satisfactory resistance to excimer laser irradiation and suppression of microcracks.

In the synthetic quartz glass substrate, the hydrogen molecule concentration at the thickness middle t/2 is preferably $3 \times 10^{16}$ to $3 \times 10^{17}$ molecules/cm$^3$, more preferably $5 \times 10^{16}$ to $2 \times 10^{17}$ molecules/cm$^3$, from the standpoints of satisfactory resistance to excimer laser irradiation and the effect of a maximum of the hydrogen molecule concentration existing at an arbitrary point in the range from the major surface to t/4.

In the synthetic quartz glass substrate, the difference between the highest and lowest values of the hydrogen molecule concentration in a plane at a certain thickness is preferably up to $5 \times 10^{16}$ molecules/cm$^3$, more preferably up to $3 \times 10^{16}$ molecules/cm$^3$, even more preferably up to $2 \times 10^{16}$ molecules/cm$^3$, from the standpoint of suppressing any difference in resistance on the excimer laser-receiving surface of the glass substrate.

Hydrogen molecules diffuse in the synthetic quartz glass substrate from the periphery to the center thereof, whereby the glass substrate is doped with hydrogen molecules. Then the hydrogen molecule concentration is lowest at the center and highest at the periphery of the glass substrate. Therefore, the lowest and highest values of the hydrogen molecule concentration in the synthetic quartz glass substrate are at center point B and distal point C of the glass substrate A as shown in FIG. 1, respectively. Then, by measuring the average hydrogen molecule concentration at these two points in thickness direction, the difference between the highest and lowest values at the identical thickness may be evaluated. The average hydrogen molecule concentration is computed by measuring a hydrogen molecule concentration from the major surface to the thickness middle t/2 in depth direction at a pitch of diameter 0.1 mm, summing up measurement values at all points, and dividing the sum by the number of measurement points.

EXAMPLE

Examples of the invention are given below by way of illustration and not by way of limitation. It is noted that hydrogen molecule concentration, birefringence, initial transmittance, OH group concentration, microcracks, and red fluorescence are measured by the methods described below.

[Hydrogen Molecule Concentration]

The hydrogen molecule concentration is measured by laser Raman spectrophotometry using a confocal Raman microscope (inVia series by Renishaw PLC). A hydrogen molecule concentration in a synthetic quartz glass plate or substrate is measured at center point B and distal point C (spaced 5 mm inside from the substrate corner) of a synthetic quartz glass plate or substrate A of 152 mm squares over the range from the major surface to the thickness middle t/2 in depth direction at a pitch of diameter 0.1 mm, as shown in FIG. 1.

[Birefringence]

The birefringence is measured at room temperature (25° C.) by a birefringence meter (ABR-10A by Uniopt Co., Ltd.). Measurement is performed on a synthetic quartz glass substrate at intervals of 10 mm, with the highest being the measured value. A He—Ne laser is used as the light source. A birefringence value at wavelength 193.4 nm is computed by multiplying the measured value by 1.5.

[Initial Transmittance]

The initial transmittance of a glass substrate at wavelength 193.4 nm is measured by UV spectrophotometry using a spectrophotometer (Cary 400 by Varian Analytical Instruments).

[Reduction of Transmittance by ArF Excimer Laser Irradiation]

ArF excimer laser radiation of wavelength 193.4 nm is irradiated to a glass substrate at a dose of 1 mJ/cm$^2$/pulse over $1 \times 10^6$ shots, after which transmittance is measured. A reduction of transmittance before and after laser irradiation is computed.

[OH Group Concentration]

Absorption of OH groups is measured by an IR spectrophotometer (SolidSpec-3700 by Shimadzu Corp.). An OH group concentration is computed from the calibration line representative of OH group concentration relative to absorption of OH groups according to the following equation.

OH group concentration (ppm)=[(absorptivity at 4522 cm$^{-1}$)/(sample thickness (cm))]×4400

The lowest and highest values of OH group concentration of a synthetic quartz glass ingot are obtained by sawing the glass ingot into round slices, measuring the OH group concentration of the slices, and assigning the smallest value as the lowest value of OH group concentration of the ingot, and the largest value as the highest value of OH group concentration of the ingot.

[Microcracks]

A glass sample is measured for transmittance before and after irradiation of ArF excimer laser radiation of wavelength 193.4 nm at a dose of 10 mJ/cm$^2$/pulse over 150 shots. The glass sample is regarded as microcracked when the transmittance reduction is 1.0% or more, and as microcrack-free when the transmittance reduction is less than 1.0%.

[Red Fluorescence]

A synthetic quartz glass substrate over its entire surface is exposed to a Xe excimer lamp (172 nm) at an illuminance of 10 mW/cm$^2$ for total 10 minutes, after which red to fluorescence is visually inspected in the dark using a UV transilluminator.

Example 1

A synthetic quartz glass ingot having an OH group concentration between the lowest value of 440 ppm and the highest value of 840 ppm was placed in a carbon mold in a vacuum melting furnace and heated in argon gas atmosphere at a temperature of 1,780° C. for 40 minutes whereby the ingot was shaped into a synthetic quartz glass block of 160 mm×160 mm×350 mm long.

The synthetic quartz glass block was surface tailored as by grinding and polishing, sliced, and chamfered, obtaining synthetic quartz glass plates of 152 mm×152 mm×7.00 mm thick.

A flat stack of five synthetic quartz glass plates was placed in an electric furnace of atmospheric pressure in air and annealed. Specifically, the stack was heated up to 1,100° C. at a rate of 108° C./hr, held at 1,100° C. for 5 minutes, cooled down to 980° C. at a rate of −15° C./hr, held at 980° C. for 10 hours, slowly cooled down to 850° C. at a rate of −30° C./hr, and further slowly cooled down to 500° C. at a rate of −50° C./hr. Thereafter, with the power supply to the furnace turned off, the stack was allowed to cool down to room temperature. The third glass plate from the top was taken out of the stack and measured for birefringence. The glass plate after the annealing treatment had a hydrogen molecule concentration which was equal to the lower limit of detection ($1.0\times10^{16}$ molecules/cm$^3$).

The synthetic quartz glass plate as annealed was placed flat in a hydrogen furnace defining a treating space of diameter 420 mm and 2,000 mm long. The furnace was purged with a hydrogen gas atmosphere (99 vol %) and the pressure in the furnace was adjusted such that the internal pressure became a slight added pressure of 0.11 MPa when the treating temperature was reached. Then the furnace temperature was elevated to 400° C. whereupon hydrogen doping treatment was performed at 400° C. for 24 hours. With the heating of the hydrogen furnace stopped, the plate was allowed to cool down to room temperature.

The synthetic quartz glass plate as hydrogen-doped was placed flat in an electric furnace. The furnace was purged with a nitrogen gas atmosphere (99 vol %) and the pressure in the furnace was adjusted such that the internal pressure became atmospheric pressure when the treating temperature of 350° C. was reached. Then the furnace temperature was elevated to 350° C. whereupon dehydrogenation treatment was performed at 350° C. for 8 hours. With the heating of the furnace stopped, the plate was allowed to cool down to room temperature.

The synthetic quartz glass plate as dehydrogenated was irradiated with UV from a low-pressure mercury lamp for 24 hours. Finally, the glass plate was lapped and polished, yielding a synthetic quartz glass substrate of 152 mm×152 mm×6.35 mm thick.

Example 2

The synthetic quartz glass plate, which was processed until the annealing step by the same procedure as in Example 1, was placed flat in a hydrogen furnace defining a treating space of diameter 420 mm and 2,000 mm long. The furnace was purged with a hydrogen gas atmosphere (99 vol %) and the pressure in the furnace was adjusted such that the internal pressure became a slight added pressure of 0.11 MPa when the treating temperature was reached. Then the furnace temperature was elevated to 400° C. whereupon hydrogen doping treatment was performed at 400° C. for 40 hours. With the heating of the hydrogen furnace stopped, the plate was allowed to cool down to room temperature.

The synthetic quartz glass plate as hydrogen-doped was placed flat in an electric furnace. The furnace was purged with a nitrogen gas atmosphere (99 vol %) and the pressure in the furnace was adjusted such that the internal pressure became atmospheric pressure when the treating temperature of 350° C. was reached. Then the furnace temperature was elevated to 350° C. whereupon dehydrogenation treatment was performed at 350° C. for 8 hours. With the heating of the furnace stopped, the plate was allowed to cool down to room temperature.

The synthetic quartz glass plate as dehydrogenated was irradiated with UV from a low-pressure mercury lamp for 24 hours. Finally, the glass plate was lapped and polished, yielding a synthetic quartz glass substrate of 152 mm×152 mm×6.35 mm thick.

Example 3

The synthetic quartz glass plate, which was processed until the annealing step by the same procedure as in Example 1, was placed flat in a hydrogen furnace defining a treating space of diameter 420 mm and 2,000 mm long. The furnace was purged with a hydrogen gas atmosphere (99 vol %) and the pressure in the furnace was adjusted such that the internal pressure became a slight added pressure of 0.11 MPa when the treating temperature was reached. Then the furnace temperature was elevated to 350° C. whereupon hydrogen doping treatment was performed at 350° C. for 32 hours. With the heating of the hydrogen furnace stopped, the plate was allowed to cool down to room temperature.

The synthetic quartz glass plate as hydrogen-doped was placed flat in an electric furnace. The furnace was purged with a nitrogen gas atmosphere (99 vol %) and the pressure in the furnace was adjusted such that the internal pressure became atmospheric pressure when the treating temperature of 350° C. was reached. Then the furnace temperature was elevated to 350° C. whereupon dehydrogenation treatment was performed at 350° C. for 8 hours. With the heating of the furnace stopped, the plate was allowed to cool down to room temperature.

The synthetic quartz glass plate as dehydrogenated was irradiated with UV from a low-pressure mercury lamp for 24 hours. Finally, the glass plate was lapped and polished, yielding a synthetic quartz glass substrate of 152 mm×152 mm×6.35 mm thick.

Example 4

The synthetic quartz glass plate, which was processed until the hydrogen doping step by the same procedure as in Example 1, was placed flat in an electric furnace. The furnace was purged with a nitrogen gas atmosphere (99 vol %) and the pressure in the furnace was adjusted such that the internal pressure became atmospheric pressure when the treating temperature of 250° C. was reached. Then the furnace temperature was elevated to 250° C. whereupon dehydrogenation treatment was performed at 250° C. for 8 hours. With the heating of the furnace stopped, the plate was allowed to cool down to room temperature.

The synthetic quartz glass plate as dehydrogenated was irradiated with UV from a low-pressure mercury lamp for 24 hours. Finally, the glass plate was lapped and polished, yielding a synthetic quartz glass substrate of 152 mm×152 mm×6.35 mm thick.

Example 5

The synthetic quartz glass plate, which was processed until the dehydrogenation step by the same procedure as in Example 1, was lapped and polished, yielding a synthetic quartz glass substrate of 152 mm×152 mm×6.35 mm thick.

Comparative Example 1

A synthetic quartz glass ingot having an OH group concentration between the lowest value of 440 ppm and the highest value of 840 ppm was placed in a carbon mold in a vacuum melting furnace and heated in argon gas atmosphere at a temperature of 1,780° C. for 40 minutes whereby the ingot was shaped into a synthetic quartz glass block of 160 mm×160 mm×210 mm long. The glass block was deburred and cut into blocks of 40 mm thick.

The synthetic quartz glass block was placed in an electric furnace of atmospheric pressure in air and annealed. Specifically, the block was heated up to 1,150° C. over 5 hours, held at 1,150° C. for 5 hours, slowly cooled down to 900° C. at a rate of −2° C./hr, and further slowly cooled down to 200° C. at a rate of −5° C./hr. Thereafter, with the power supply to the furnace turned off, the block was allowed to cool down to room temperature. With the furnace opened, the glass block was taken out. The glass block after the annealing treatment had a hydrogen molecule concentration which was equal to the lower limit of detection ($1.0\times10^{16}$ molecules/cm$^3$). Using a surface grinding machine, squareness treatment and surface treatment were performed on the six surfaces of the block, whereby the block was finished to 6 inch (152.4 mm) squares. The block at the center was sliced into a synthetic quartz glass plate of 152 mm×152 mm×7.00 mm thick.

The synthetic quartz glass plate was irradiated with UV from a low-pressure mercury lamp for 24 hours. Finally, the glass plate was lapped and polished, yielding a synthetic quartz glass substrate of 152 mm×152 mm×6.35 mm thick.

Comparative Example 2

The synthetic quartz glass block, which was processed until the annealing step by the same procedure as in Comparative Example 1, was subjected to squareness treatment and surface treatment on its six surfaces by means of a surface grinding machine, whereby the block was finished to 6 inch (152.4 mm) squares. The block was sliced, chamfered, lapped, and polished, yielding a synthetic quartz glass substrate of 152 mm×152 mm×6.35 mm thick.

Comparative Example 3

The synthetic quartz glass plate, which was processed until the hydrogen doping step by the same procedure as in Example 1, was irradiated with UV from a low-pressure mercury lamp for 24 hours. Finally, the glass plate was lapped and polished, yielding a synthetic quartz glass substrate of 152 mm×152 mm×6.35 mm thick.

Comparative Example 4

The synthetic quartz glass plate, which was processed until the hydrogen doping step by the same procedure as in Example 1, was placed flat in an electric furnace. The furnace was purged with a nitrogen gas atmosphere (99 vol %) and the pressure in the furnace was adjusted such that the internal pressure became atmospheric pressure when the treating temperature of 400° C. was reached. Then the furnace temperature was elevated to 400° C. whereupon dehydrogenation treatment was performed at 400° C. for 16 hours. With the heating of the furnace stopped, the plate was allowed to cool down to room temperature.

The synthetic quartz glass plate was irradiated with UV from a low-pressure mercury lamp for 24 hours. Finally, the glass plate was lapped and polished, yielding a synthetic quartz glass substrate of 152 mm×152 mm×6.35 mm thick.

The synthetic quartz glass substrates obtained in Examples and Comparative Examples were measured with respect to hydrogen molecule concentration (highest, lowest, average values), whether or not a maximum is observed in the range from the major surface to t/4, birefringence and initial transmittance at wavelength 193.4 nm, reduction of transmittance by ArF excimer laser irradiation, whether or not microcracks form, and whether or not red fluorescence emanates. The results are summarized in Table 1.

TABLE 1

|  |  |  | Example |  |  |  |  | Comparative Example |  |  |  |
| --- | --- | --- | --- | --- | --- | --- | --- | --- | --- | --- | --- |
|  |  |  | 1 | 2 | 3 | 4 | 5 | 1 | 2 | 3 | 4 |
| Annealing treatment | Shape | | substrate | substrate | substrate | substrate | substrate | block | block | substrate | substrate |
|  | Time (hr) | | 40 | 40 | 40 | 40 | 40 | 275 | 275 | 40 | 40 |
| Hydrogen doping treatment | Temperature (° C.) | | 400 | 400 | 350 | 400 | 400 | — | — | 400 | 400 |
|  | Time (hr) | | 24 | 40 | 32 | 24 | 24 | — | — | 24 | 24 |
| Dehydrogenation treatment | Temperature (° C.) | | 350 | 350 | 350 | 250 | 350 | — | — | — | 400 |
|  | Time (hr) | | 8 | 8 | 8 | 8 | 8 | — | — | — | 16 |
| UV irradiation | Time (hr) | | 24 | 24 | 24 | 24 | — | 24 | — | 24 | 24 |
| Hydrogen molecule concentration ($\times10^{17}$ molecules/cm$^3$) | Highest | | 2.5 | 4.0 | 2.2 | 2.8 | 2.5 | 5.0 | 5.0 | 7.0 | 1.5 |
|  | Lowest | | 0.7 | 1.1 | 0.6 | 0.7 | 0.7 | 0.3 | 0.3 | 0.7 | ≤0.2 |
|  | Average | Center point B | 1.0 | 2.0 | 0.9 | 1.1 | 1.0 | 5.0 | 5.0 | 2.3 | 0.6 |
|  |  | Distal point C | 1.2 | 2.1 | 0.9 | 1.3 | 1.2 | 0.3 | 0.3 | 2.5 | 0.6 |
| Maximum | | | observed | observed | observed | observed | observed | not observed | not observed | not observed | observed |
| Birefringence (nm/cm) | | | 1.35 | 1.73 | 1.65 | 1.82 | 1.87 | 1.85 | 1.89 | 1.90 | 1.92 |
| Initial transmittance (%) | | | 90.5 | 90.5 | 90.5 | 90.5 | 90.2 | 90.6 | 90.4 | 90.5 | 90.5 |
| Reduction of transmittance (%) | | | ≤0.1 | ≤0.1 | ≤0.1 | ≤0.1 | ≤0.1 | 0.2 | 0.2 | 0.1 | 0.4 |
| Defects after UV irradiation | Microcracks | | not observed | not observed | not observed | not observed | not observed | not observed | not observed | observed | not observed |
|  | Red fluorescence | | not observed | not observed | not observed | not observed | not observed | not observed | not observed | not observed | observed |

As seen from Table 1, the synthetic quartz glass substrates of Examples 1 to 5 obtained from the inventive method show a low birefringence, a high initial transmittance, a less reduction of transmittance by ArF excimer laser irradiation, and no defects after UV irradiation.

The synthetic quartz glass substrates of Comparative Examples 1 and 2 show a birefringence and initial transmittance comparable to those in Examples, but take 7-fold longer time for annealing treatment than in Examples. Although the hydrogen molecule concentration is equivalent to those in Examples, the reduction of transmittance by ArF excimer laser irradiation is greater than in Examples, because of the lack of a maximum.

The synthetic quartz glass substrate of Comparative Example 3 without dehydrogenation treatment shows a high hydrogen molecule concentration at the surface and microcracking during excimer laser irradiation.

Comparative Example 4 takes 16 hours for dehydrogenation treatment. Dehydrogenation treatment for more than 10 hours allows more hydrogen molecules to be eliminated from the major surface and interior of the synthetic quartz glass substrate. As a result, despite a maximum observed, the reduction of transmittance by excimer laser irradiation is greater and red fluorescence emanates upon UV irradiation.

Japanese Patent Application No. 2018-008527 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A synthetic quartz glass substrate having a pair of major surfaces and a thickness t therebetween, the substrate having a hydrogen molecule concentration at an arbitrary point on the substrate, which has a lowest value of at least $3\times10^{16}$ molecules/cm$^3$ and a highest value of up to $1\times10^{18}$ molecules/cm$^3$ in the range from one of the major surfaces to the thickness middle t/2, a maximum at any point in the range from the one of the major surfaces to t/4, and a point having a higher hydrogen molecule concentration than on the one of the major surfaces existing in the interior below the one of the major surfaces, wherein the thickness t is 6.35 mm to 10 mm.

2. The synthetic quartz glass substrate of claim 1 wherein the hydrogen molecule concentration at the one of the major surfaces is $5\times10^{16}$ to $5\times10^{17}$ molecules/cm$^3$.

3. The synthetic quartz glass substrate of claim 1 wherein the hydrogen molecule concentration at the thickness middle t/2 is $3\times10^{16}$ to $3\times10^{17}$ molecules/cm$^3$.

4. The synthetic quartz glass substrate of claim 1 wherein the difference between the highest and lowest values of the hydrogen molecule concentration in a plane at a certain thickness is up to $5\times10^{16}$ molecules/cm$^3$.

5. A method for preparing a synthetic quartz glass substrate of claim 1, comprising the steps of:
(a) hot shaping a synthetic quartz glass ingot into a synthetic quartz glass block,
(b) slicing the synthetic quartz glass block into a synthetic quartz glass plate,
(c) subjecting the glass plate to annealing treatment at a temperature of 500 to 1,250° C. for 15 to 60 hours,
(d) subjecting the glass plate as annealed to hydrogen doping treatment in a hydrogen gas atmosphere at 300 to 450° C. for 20 to 40 hours, and
(e) subjecting the glass plate as doped to dehydrogenation treatment at 200 to 400° C. for 5 to 10 hours.

6. The method of claim 5, further comprising the step (f) of irradiating UV radiation to the glass plate as dehydrogenated in step (e).

7. The method of claim 5 wherein the synthetic quartz glass plate as annealed in step (c) has a hydrogen molecule concentration with a highest value of up to $2\times10^{16}$ molecules/cm$^3$.

8. The method of claim 5 wherein the synthetic quartz glass ingot used in step (a) has an OH group concentration of 300 to 1,200 ppm.

* * * * *